United States Patent
Cameron et al.

(10) Patent No.: US 7,472,253 B1
(45) Date of Patent: Dec. 30, 2008

(54) SYSTEM AND METHOD FOR MANAGING TABLE LOOKASIDE BUFFER PERFORMANCE

(75) Inventors: George Cameron, Santa Clara, CA (US); Blake Jones, Santa Clara, CA (US); Jeffrey Bonwick, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 300 days.

(21) Appl. No.: 11/525,669

(22) Filed: Sep. 22, 2006

(51) Int. Cl.
*G06F 12/10* (2006.01)
(52) U.S. Cl. .................. 711/203; 711/207
(58) Field of Classification Search .......... None
See application file for complete search history.

(56) References Cited

U.S. PATENT DOCUMENTS

| | | | |
|---|---|---|---|
| 5,446,854 A * | 8/1995 | Khalidi et al. ............ 711/1 |
| 6,195,676 B1 * | 2/2001 | Spix et al. .............. 718/107 |
| 6,745,306 B1 * | 6/2004 | Willman et al. .......... 711/163 |
| 7,058,768 B2 * | 6/2006 | Willman et al. .......... 711/154 |
| 7,181,589 B2 * | 2/2007 | Miller et al. ............ 711/206 |
| 2003/0200402 A1 * | 10/2003 | Willman et al. .......... 711/154 |
| 2005/0066147 A1 * | 3/2005 | Miller et al. ............ 711/207 |
| 2007/0038810 A1 * | 2/2007 | Rosen et al. ............ 711/132 |

* cited by examiner

*Primary Examiner*—Kevin Verbrugge
(74) *Attorney, Agent, or Firm*—Martine Penilla & Gencarella, LLP

(57) ABSTRACT

A computer system comprising a main memory and a processor die coupled to the main memory by a first bus. The processor die includes a processor core coupled to a first cache memory and multiple base and bounds registers (BBRS). Each of BBRs have a base virtual address field, an ending virtual address field and a base physical address field. The first cache memory has a table lookaside buffer (TLB) entry stored therein.

18 Claims, 9 Drawing Sheets

SYSTEM AND METHOD FOR MANAGING TABLE LOOKASIDE BUFFER PERFORMANCE

CROSS REFERENCE TO RELATED APPLICATIONS

This application is related to U.S. patent application Ser. No. 11/525,686 filed on Sep. 22, 2006 and entitled "System and Method for Managing Copy-on-Write Faults and Change-Protection" which is incorporated herein by reference in its entirety. This application is also related to U.S. patent application Ser. No. 11/525,688 filed on Sep. 22, 2006 and entitled "System and Method for Reference and Modification Tracking" which is incorporated herein by reference in its entirety.

BACKGROUND

The present invention relates generally to computer memory systems, and more particularly, to methods and systems for operating a translation lookaside buffer (TLB).

A computer processor uses a translation lookaside buffer (TLB) to translate between virtual addresses and corresponding physical addresses. The TLB is typically stored in cache memory and often in the portion of the cache memory that is on the same die as the processor (e.g., L1 cache). Generally every instruction, data fetch and store accesses the TLB to fetch and/or store the correct data for the execution of each instruction. As the TLB is accessed for essentially every instruction or data fetch or store, the TLB is in the "critical path" and directly impacts the speed of execution possible by the processor.

The size of the TLB is related to the size of the main memory coupled to the processor. By way of example, a 1 Gb memory uses a TLB that can include translations between 1 Gb virtual addresses and 1 Gb physical addresses. This is referred to as the reach of the TLB. As the TLB grows larger to reach the ever larger main memory, the TLB requires more time to access, increased power consumption and larger space on the die.

In addition to direct correlations between virtual addresses and corresponding physical addresses, the TLB can also be content addressable memory (CAM) where related content is correlated.

If the desired data is not located within the then current page of main memory referenced in the currently loaded TLB entries (referred to as a TLB miss), then the TLB entry must be reloaded to include the page that actually does include the desired page of main memory. A TLB reload is "expensive" as it delays the processor in completing the current data processing operation. The TLB can also address multiple sizes of memory pages (e.g., 8 k page, 64 k page, 512 k page, 4 Mb page, etc.). As the size of the virtual memory increases, the number of TLB misses increases and TLB must therefore be TLB entries must be reloaded more often.

Unfortunately, the demand for ever-larger memory size is rapidly outpacing the reach of the TLB. In view of the foregoing, there is a need for an improved TLB and improved systems and methods of using the TLB.

SUMMARY

Broadly speaking, the present invention fills these needs by providing an improved TLB and improved systems and methods of using the TLB. It should be appreciated that the present invention can be implemented in numerous ways, including as a process, an apparatus, a system, computer readable media, or a device. Several inventive embodiments of the present invention are described below.

One embodiment provides a computer system comprising a main memory and a processor die coupled to the main memory by a first bus. The processor die includes a processor core coupled to a first cache memory and multiple base and bounds registers (BBRS). Each of BBRs have a base virtual address field, an ending virtual address field and a base physical address field. The first cache memory has a table lookaside buffer (TLB) entry stored therein.

The base virtual address field for each of the BBRs can include a first virtual address for a corresponding page of main memory. The ending virtual address field for each of the BBRs can include a size of the corresponding page of main memory. The base physical address field for each of the BBRs can include a first physical address of the corresponding page of main memory.

Each of the BBRs can include a flags field. The flags field can include a status of the corresponding page of main memory.

The computer system can also include logic for determining the selected virtual address is not within a reach of a TLB entry that is currently loaded in the TLB, logic for identifying one of the BBR entries that includes the selected virtual address if one of a BBR entries includes the selected virtual address. Logic for calculating a new TLB entry that includes the selected virtual address and logic for loading the new TLB entry in the TBL are also included.

The processor die can include logic for determining the selected virtual address is not within a reach of a TLB entry that is currently loaded in the TLB, logic for identifying one of the BBR entries that includes the selected virtual address if one of a BBR entries includes the selected virtual address. Logic for calculating a new TLB entry that includes the selected virtual address and logic for loading the new TLB entry in the TLB are also included.

The computer system can also include a second cache memory. The second cache memory can include at least one additional entry of the TLB. The main memory can include at least one additional entry of TLB.

Another embodiment provides a method of translating a selected virtual address in a memory reference. The method includes determining the selected virtual address is not within a reach of a TLB entry that is currently loaded in the TLB. If one of multiple BBR entries includes the selected virtual address, then identifying one of the BBR entries that includes the selected virtual address. A new TLB entry that includes the selected virtual address is calculated and the new TLB entry is loaded into the TLB.

If the selected virtual address is within a reach of the TLB entry that is currently loaded in the TLB, then translating the selected virtual address to a corresponding physical address and accessing the memory location at the corresponding physical address.

If none of the BBR entries includes the selected virtual address, then loading a next TLB entry in the TLB and examining the TLB to determine if the selected virtual address is within a reach of the TLB entry that is currently loaded in the TLB.

Each one of the BBRs can include a base virtual address field, an ending virtual address field and a base physical address field. The base virtual address field for each BBRs includes a first virtual address for a corresponding page of main memory, wherein the ending virtual address field for each BBRs includes a size of the corresponding page of main memory, and wherein the base physical address field for each BBRs includes a first physical address of the corresponding page of main memory.

Each of the BBR entries includes a flags field. The flags field can include at least one status of the corresponding BBR entry. The at least one status of the corresponding BBR entry can include at least one of a read status, and write status, and read-only status, a read-write status, a referenced status or a modified status.

Yet another embodiment provides a method for processing an instruction. The method includes determining the selected virtual address is not within a reach of a TLB entry that is currently loaded in the TLB. If one of several BBR entries includes the selected virtual address, then identifying the BBR entry that includes the selected virtual address, calculating a new TLB entry that includes the selected virtual address, and loading the new TLB entry in the TLB. If the selected virtual address is within a reach of a TLB entry that is currently loaded in the TLB, then translating the selected virtual address to a corresponding physical address and accessing the memory location at the corresponding physical address. If none of the BBR entries includes the selected virtual address, then loading a next TLB entry in the TLB and examining the TLB to determine if the selected virtual address is within a reach of the TLB entry that is currently loaded in the TLB.

Another embodiment provides a method of identifying a shared main memory page containing a physical address corresponding to a virtual address included in an issued write instruction. The method includes determining the selected virtual address is not within a reach of a TLB entry that is currently loaded in the TLB. If one of the BBR entries includes the selected virtual address, then identifying one of the BBR entries that includes the selected virtual address, calculating a new TLB entry that includes the selected virtual address and loading the new TLB entry in the TLB.

The write instruction can be a first write instruction, and the method of identifying a shared main memory page containing a physical address corresponding to a virtual address included in the first write instruction can be included in a copy-on-write (COW) fault. The COW fault can include forking a parent process to create a child process, assigning parent's virtual-to-physical address translations read-only status wherein the first write instruction is issued from a first issuing process, the first issuing process being a first one of the parent process or the child process and issuing a copy-on-write fault to the first issuing process.

The method can also include creating a copy of the shared main memory page, assigning the copy of the shared main memory page to the first issuing process including assigning a read write status to the copy of the shared main memory page for the first issuing process and reissuing the first write instruction from the first issuing process.

The method can also include issuing a second write instruction from a second one of the parent process or the child process and issuing a copy-on-write fault to the second issuing process. The method can also include assigning parent's virtual-to-physical address translations read-write status to the second issuing process, reissuing the second write instruction. The status of the shared main memory page can be maintained in the TLB and a corresponding entry in the BBR.

The write instruction can be a third write instruction and wherein the method of identifying a shared main memory page containing a physical address corresponding to a virtual address can be included in a change-protection process. The change-protection process can include sharing multiple main memory pages between a multiple processes. The third write instruction can be issued from a third issuing process, the third issuing process being one of the processes. The identified shared main memory page can be requested to be assigned a write status for the third issuing process. Write access can be assigned to the third issuing process for the identified shared main memory page and the third write instruction can be reissued. Data can be written to the identified shared main memory page and the identified shared main memory page can be requested to be assigned a read-only status for each of the processes. A read-only access can be assigned to the processes for the identified shared main memory page. The status of the shared main memory page can be maintained in the TLB and a corresponding entry in the BBRs.

Another embodiment includes a computer system including a main memory, a processor die coupled to the main memory by a first bus, the processor die including a processor core coupled to a first cache memory and multiple BBRs, each of the BBRs having a base virtual address field, an ending virtual address field and a base physical address field, the first cache memory having a TLB entry stored therein. The computer system also includes logic for identifying a shared main memory page containing a physical address corresponding to a virtual address included in an issued write instruction including logic for determining the selected virtual address is not within a reach of a TLB entry that is currently loaded in the TLB. If one of BBR entries includes the selected virtual address, then identifying one of the BBR entries that includes the selected virtual address, logic for calculating a new TLB entry that includes the selected virtual address and logic for loading the new TLB entry in the TLB.

The write instruction can be a first write instruction, and the logic for identifying a shared main memory page containing a physical address corresponding to a virtual address included in the first write instruction is included in a copy-on-write (COW) fault. The COW fault can include logic for forking a parent process to create a child process, logic for assigning parent's virtual-to-physical address translations read-only status wherein the first write instruction is issued from a first issuing process, the first issuing process being a first one of the parent process or the child process and logic for issuing a COW fault to the first issuing process.

The write instruction can be a third write instruction and the logic for identifying a shared main memory page containing a physical address corresponding to a virtual address can be included in a change-protection process. The change protection process can include logic for sharing multiple main memory pages between multiple processes. The third write instruction can be issued from a third issuing process, the third issuing process being one of the processes. Logic for requesting the identified shared main memory page be assigned a write status for the third issuing process, logic for assigning write access to the third issuing process for the identified shared main memory page, logic for reissuing the third write instruction, logic for writing data to the identified shared main memory page, logic for requesting the identified shared main memory page be assigned a read-only status for each of the plurality of processes, and logic for assigning read-only access to the plurality of processes for the identified shared main memory page can also be included.

The status of the shared main memory page is maintained in the TLB and a corresponding entry in the BBRs. The write instruction can be a first write instruction, and the logic for identifying a shared main memory page containing a physical address corresponding to a virtual address included in the first write instruction is included in a copy-on-write (COW) fault.

The COW fault includes logic for forking a parent process to create a child process, logic for assigning parent's virtual-to-physical address translations read-only status wherein the first write instruction is issued from a first issuing process, the first issuing process being a first one of the parent process or the child process and logic for issuing a COW fault to the first issuing process.

The computer system can also include logic for creating a copy of the shared main memory page, logic for assigning the copy of the shared main memory page to the first issuing process including assigning a read write status to the copy of the shared main memory page for the first issuing process and logic for reissuing the first write instruction from the first issuing process.

The computer system can also include logic for issuing a second write instruction from a second one of the parent process or the child process and logic for issuing a copy-on-write fault to the second issuing process. The computer system can also include logic for assigning parent's virtual-to-physical address translations read-write status to the second issuing process and logic for reissuing the second write instruction. The status of the shared main memory page can be maintained in the TLB and a corresponding entry in the BBRs.

Another embodiment provides a method of identifying a shared main memory page containing a physical address corresponding to a virtual address included in an issued write instruction. The method includes determining the selected virtual address is not within a reach of a TLB entry that is currently loaded in the TLB, if one of several BBR entries includes the selected virtual address, then identifying the BBR entries that includes the selected virtual address, calculating a new TLB entry that includes the selected virtual address, loading the new TLB entry in the TLB. The write instruction can be a first write instruction the method of identifying a shared main memory page containing a physical address corresponding to a virtual address included in the first write instruction is included in a copy-on-write (COW) fault. The COW fault can include forking a parent process to create a child process, assigning parent's virtual-to-physical address translations read-only status wherein the first write instruction is issued from a first issuing process, the first issuing process being a first one of the parent process or the child process and issuing a COW fault to the first issuing process. The status of the shared main memory page can be maintained in the TLB and a corresponding entry in the BBRs.

Another embodiment provides a method for propagating reference and modification bit values into a translation table. The method includes issuing a write instruction including a virtual address, translating the virtual address to a corresponding physical address in a corresponding entry in a TLB, writing data to the corresponding physical address, setting at least one of a reference bit value or a modification bit value in the corresponding entry in the TLB, analyzing the TLB to identify any set reference bit values and set modification bit values, updating a corresponding entry in a translation table for each one of the identified set reference bit values and the identified set modification bit values and resetting the identified set reference bit values and the identified set modification bit values in the TLB.

Translating the virtual address to the corresponding physical address in the corresponding entry in a TLB can include determining the selected virtual address is not within a reach of the TLB entry that is currently loaded in the TLB, if one of several BBR entries includes the selected virtual address, then identifying the BBR entries that includes the selected virtual address, calculating a new TLB entry that includes the selected virtual address and loading the new TLB entry in the TLB.

Updating the corresponding entry in the translation table for each on the identified set reference bit values and identified set modification bit values can include determining if a corresponding origin flag for each one of the identified set reference bit values and identified set modification bit values indicates the BBR, updating a corresponding entry in the BBR for each one of the identified set reference bit values and the identified set modification bit values, determining if a corresponding origin flag for each one of the identified set reference bit values and identified set modification bit values indicates the transfer table and updating a corresponding entry in the transfer table for each one of the identified set reference bit values and the identified set modification bit values.

Resetting the identified set reference bit values and the identified set modification bit values in the TLB can be performed by an application such as the operating system or another application.

Another embodiment provides a method for propagating reference and modification bit values into a translation table. The method includes issuing a write instruction including a virtual address, translating the virtual address to a corresponding physical address in a corresponding entry in a TLB including determining the selected virtual address is not within a reach of the TLB entry that is currently loaded in the TLB, if one of several BBR entries includes the selected virtual address, then identifying the BBR entries that includes the selected virtual address, calculating a new TLB entry that includes the selected virtual, address and loading the new TLB entry in the TLB, writing data to the corresponding physical address, setting at least one of a reference bit value or a modification bit value in the corresponding entry in the TLB, analyzing the TLB to identify any set reference bit values and set modification bit values, updating a corresponding entry in a translation table for each one of the identified set reference bit values and the identified set modification bit values including, determining if a corresponding origin flag for each one of the identified set reference bit values and identified set modification bit values indicates the BBR, updating a corresponding entry in the BBR for each one of the identified set reference bit values and the identified set modification bit values, determining if a corresponding origin flag for each one of the identified set reference bit values and identified set modification bit values indicates the transfer table and updating a corresponding entry in the transfer table for each one of the identified set reference bit values and the identified set modification bit values and resetting the identified set reference bit values and the identified set modification bit values in the TLB.

Another embodiment provides a computer system including a main memory, a processor die coupled to the main memory by a first bus, the processor die including a processor core coupled to a first cache memory and multiple BBRs, each one of the BBRs having a base virtual address field, an ending virtual address field and a base physical address field, the first cache memory having a TLB stored therein, the TLB including multiple TLB entries, each one of the TLB entries including an origin flag. The system also includes logic for issuing a write instruction including a virtual address, logic for translating the virtual address to a corresponding physical address in a corresponding entry in a TLB, logic for writing data to the corresponding physical address, logic for setting at least one of a reference bit value or a modification bit value in the corresponding entry in the TLB, logic for analyzing the TLB to identify any set reference bit values and set modification bit values, logic for updating a corresponding entry in a translation table for each one of the identified set reference bit values and the identified set modification bit values and logic for resetting the identified set reference bit values and the identified set modification bit values in the TLB.

The logic for translating the virtual address to the corresponding physical address in the corresponding entry in the TLB can include logic for determining the selected virtual address is not within a reach of the TLB entry that is currently loaded in the TLB, if one of the BBR entries includes the selected virtual address, then identifying the BBR entry that includes the selected virtual address, logic for calculating a new TLB entry that includes the selected virtual address and logic for loading the new TLB entry in the TLB.

The logic for updating the corresponding entry in the translation table for each on the identified set reference bit values and identified set modification bit values can include logic for determining if a corresponding origin flag for each one of the identified set reference bit values and identified set modification bit values indicates the BBR, logic for updating a corresponding entry in the BBR for each one of the identified set reference bit values and the identified set modification bit values, logic for determining if a corresponding origin flag for each one of the identified set reference bit values and identified set modification bit values indicates the transfer table and logic for updating a corresponding entry in the transfer table for each one of the identified set reference bit values and the identified set modification bit values.

The logic for resetting the identified set reference bit values and the identified set modification bit values in the TLB can be included in an application or the operating system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
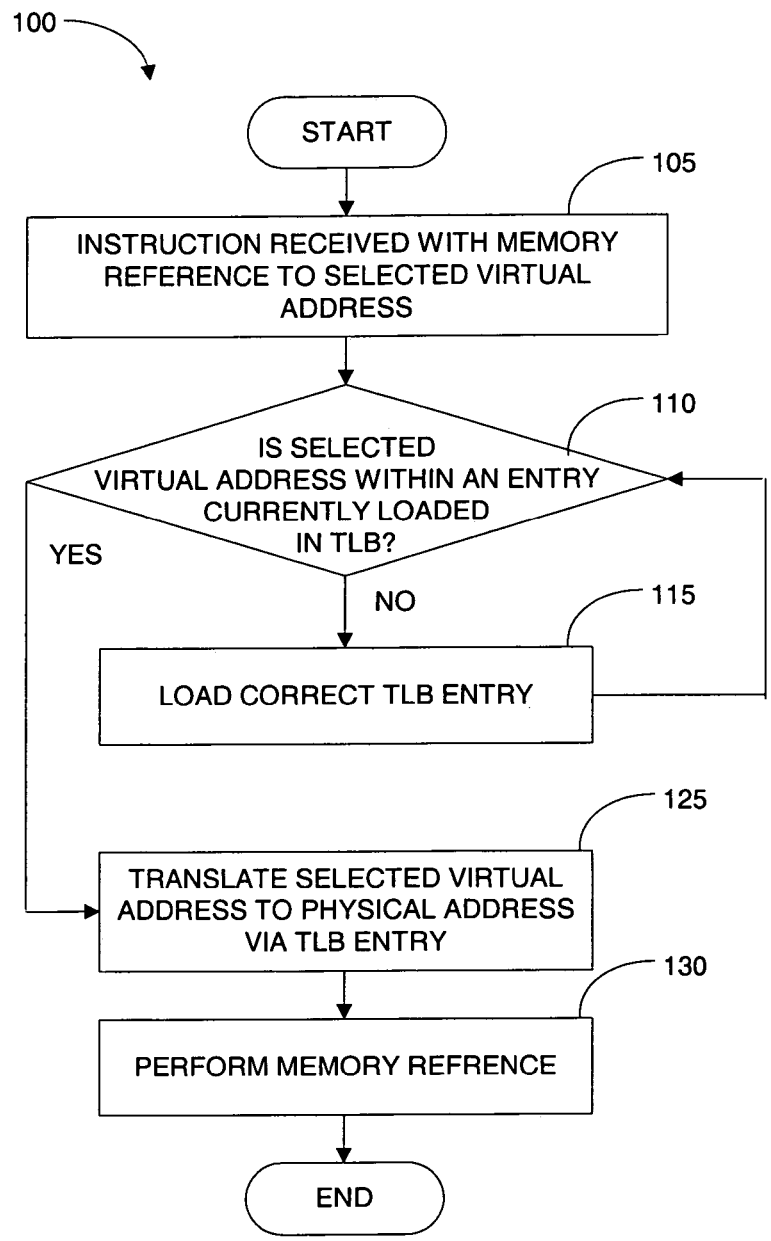
FIG. 1 is a flowchart diagram that illustrates the method operations performed in a typical translation of a memory reference.

Several exemplary embodiments for an improved translation lookaside buffer (TLB) will now be described. It will be apparent to those skilled in the art that the present invention may be practiced without some or all of the specific details set forth herein.

The TLB translates between virtual addresses and corresponding physical addresses in the main memory of a computer. Each entry in the TLB includes a page number field and an offset field. The page number field defines the page or section of the main memory that is reached by the TLB. The offset field defines the address within that page. Each entry in the TLB can also include a context field that identifies a context of the entry.

An example TLB can include 512 entries. Each entry can span 4 megabytes and therefore the reach of the TLB is 2 Gb (512 entries*4 Mb/entry=2 Gb). Therefore the TLB can only reach 2 Gb of the main memory. If the main memory is, for example, 100 Gb, then the TLB entries must be completely reloaded at least 50 times to access all 100 Gb of the main memory. Increasing the number of entries in the TLB (e.g., to increase the reach to 50 Gb) would require a much larger TLB. TLBs have increased reach by either increasing the number of entries in the TLB and/or by allowing each TLB entry to reference a larger portion of the main memory. Such a larger TLB requires a larger cache memory that also undesirably consumes additional area and power on the microprocessor die. Multiple page sizes can also be used but the multiple page sizes increase TLB complexity and search time. Further, using larger page sizes places an extra burden on the computer operating system to allocate large page-aligned portions of contiguous main memory. BBRs can reference various sizes of main memory pages. These main memory pages are not limited to page sizes that are a function of 2 (e.g., 2 k, 4 k, 8 k, 16 k, 32 k, 64 k, etc.) but rather can reference main memory pages of any size (4 k, 12 k, 18 k, 36 k, etc.).

Memory sizes on modern machines have continued to grow exponentially. Since every virtual memory reference requires a TLB lookup, the TLB reach (i.e. the number of TLB entries multiplied by the maximum size of each entry) has correspondingly grown with the increased memory size, so that the software being executed on the computer is not bottlenecked performing slow (e.g., expensive) TLB misses.

When a TLB miss occurs while translating a memory reference (instruction fetch, data fetch, data write, etc.), an attempt to resolve the miss includes searching a translation table of some sort (e.g., IBM 370 segment and page tables, Intel page tables, SPARC TSB, etc.). In some systems the computer hardware searches the translation table, while in other systems the operating system software searches the translation table. Since the translation tables tend to be too big to fit in the processor's cache, these searches frequently cause cache misses, which are yet another significant bottleneck on computer system performance.

FIG. 1 is a flowchart diagram that illustrates the method operations 100 performed in a typical translation of a memory reference. In an operation 105, an instruction with a memory reference is received. The memory reference includes a selected virtual address.

In an operation 110, the currently loaded TLB entries are interrogated to determine if the selected virtual address is within the currently loaded TLB entries. If a TLB miss occurs (i.e., the selected virtual address is not within the reach of the currently loaded TLB entries), then the method operations continue in an operation 115.

In operation 115, a subsequent TLB entry is retrieved from the translation table and loaded into the TLB. The method operations repeat beginning at operation 110 as described above.

Multiple misses can occur as the translation tables are walked by the TLB miss handler (i.e., a translation table walk). Each subsequent TLB miss will require loading a subsequent TLB entry. Until the TLB miss is resolved, the instruction received in operation 105 above is stalled. Therefore, the operations of the computer system can be temporarily stalled.

Referring again to operation 110, if a TLB hit occurs (i.e., the selected virtual address is within the reach of the currently loaded TLB), then the method operations continue in an operation 125. In operation 125, the selected virtual address is translated to the physical address and the memory reference is performed in an operation 130.

Base and Bounds Resisters

One approach to improve TLB performance includes generating TLB entries based on information stored in base and bounds registers (BBRs). A set of BBRs can also be used as a cache or index for the TLB. Each entry in the BBR set could include:
 a Base Virtual Address (BBR.BVA) field
 a Ending Virtual Address (BBR.EVA) field
 a Physical Address (BBR.PA) field
 a flags (BBR.FLAGS) field It should be noted that the each BBR entry can also include additional fields other than those listed above. When the TLB logic cannot find an entry for a virtual address (VA), the BBRs are searched for an entry where both the start and the end of the page containing the virtual address are between the entry's BVA and EVA. If such an entry is found, the logic would load the TLB with a new TLB entry created from the data in the fields from the BBR. The physical address would be determined as follows: (VA−BBR.BVA+BBR.PA). The flags data can also be copied from BBR.FLAGS field into a corresponding flags field in the new TLB entry.

A hit in the BBRs is substantially faster than either a hardware-driven or software-driven page translation table walk (e.g., as described in FIG. 1 above) since the BBR hit would avoid cache misses and traps to the operating system. The BBR entries can cover any selected span of physical memory, and therefore can generate TLB entries quickly and the TLB can revert to only working with entries of a single page size.

As a result, a TLB hit should occur in fewer iterations and therefore faster because the TLB miss logic is simpler and completes execution faster. The processor can therefore be scaled to higher clock rates since the TLB logic is simplified. The BBR can cover many small or large pages of physical memory. The BBRs can also provide a virtually unlimited TLB reach by allowing the TLB to quickly address any location in the physical memory.

Figure 2:
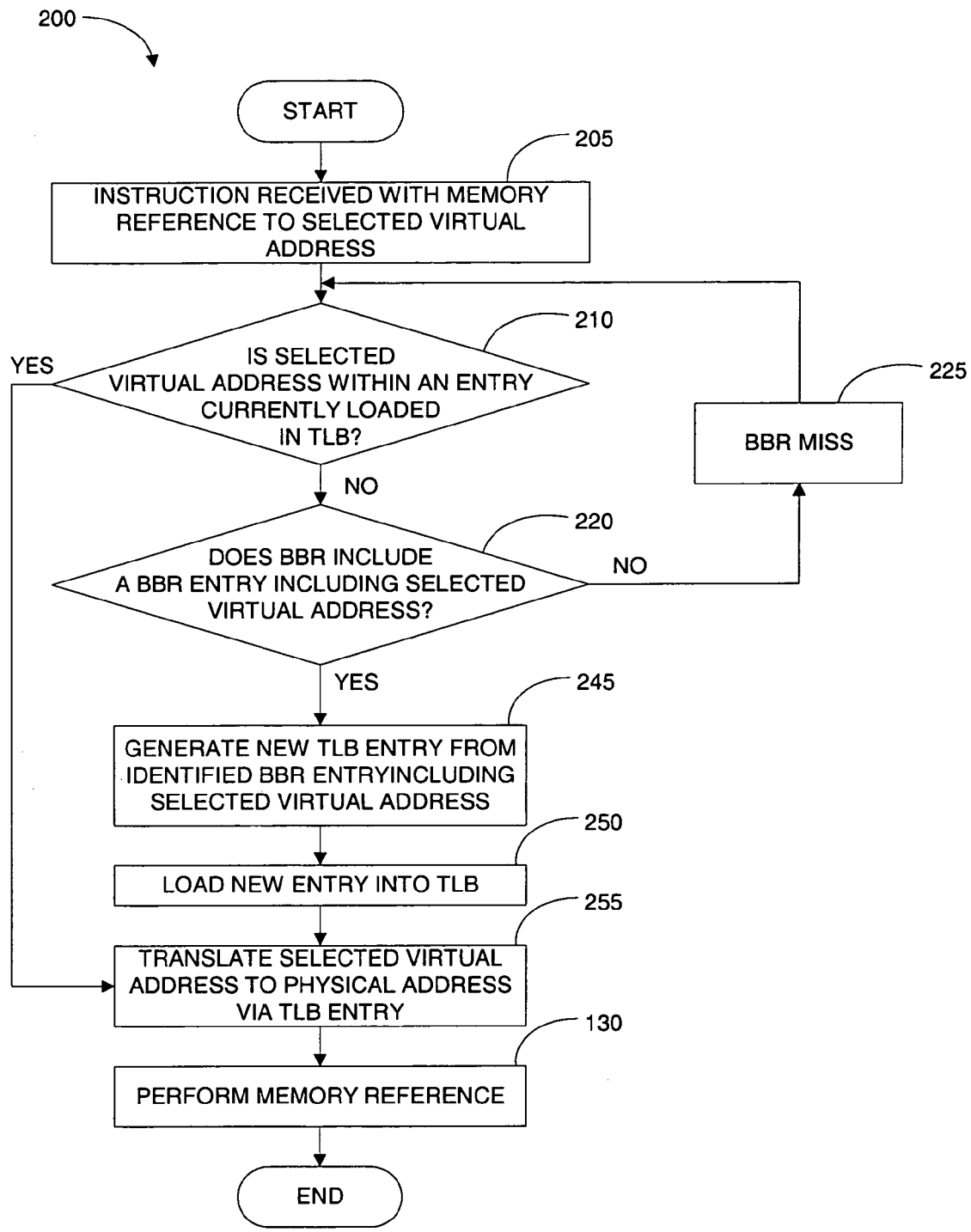
FIG. 2 is a flowchart diagram that illustrates the method operations performed in translating a virtual address to a corresponding physical address, in accordance with an embodiment of the present invention.

FIG. 2 is a flowchart diagram that illustrates the method operations 200 performed in translating a virtual address to a corresponding physical address, in accordance with an embodiment of the present invention. In an operation 205, an instruction with a memory reference is received. The memory reference includes the selected virtual address.

In an operation 210, the currently loaded TLB entries are interrogated to determine if the selected virtual address is within the one of the TLB entries currently loaded in the TLB. If a TLB miss occurs (i.e., the selected virtual address is not within one of the entries currently loaded in the TLB), then the method operations continue in an operation 220.

In operation 220, the BBRs are interrogated to determine if there is a BBR entry that includes the selected virtual address. If there is not a BBR entry that includes the selected virtual address (i.e., a BBR miss), then the method operations continue in an operation 225. In operation 225, one or more of several operations can occur depending on the particular hardware and software configuration. By way of example, the operating system can be interrupted if the operating system is configured to process a BBR miss. A BBR table walk could also be applied to load a new entry into the BBRs and the method operations can continue in operation 220 as described above. Additional entries can also be entered into the TLB from the translation table and the method operations can continue in operation 210 as described above.

Referring again to operation 220, if there is a BBR entry that includes the selected virtual address (i.e., a BBR hit), then the method operations continue in an operation 240. In operation 240, a new TLB entry is calculated from the data in the identified BBR entry.

In an operation 245, the new TLB entry is loaded in the TLB and the method operations continue in an operation 250. The new TLB entry can also include the BBR flags data included in the BBR entry used to calculate the new TLB entry.

The BBRs provide a shortcut to the TLB loading process and ensure that a first TLB miss is generally the only TLB miss for the virtual address translation. As a result, a TLB miss should stall the memory reference only for the time required to interrogate the BBRs, generate the new TLB entry and load the new TLB entry. As a result, the TLB miss does not require any other cache or other memory references. However, if a BBR miss occurs, then the BBR table or translation table can then be accessed to identify a next entry for the TLB.

Referring again to operation 210, if a TLB hit occurs (i.e., the selected virtual address is within the reach of the currently loaded TLB), then the method operations continue in an operation 255. In operation 255, the selected virtual address is translated to the physical address and in an operation 260, the physical address is accessed (e.g., read, write, etc.) is performed and the method operations can end.

Figures 3, 4A, 4B:
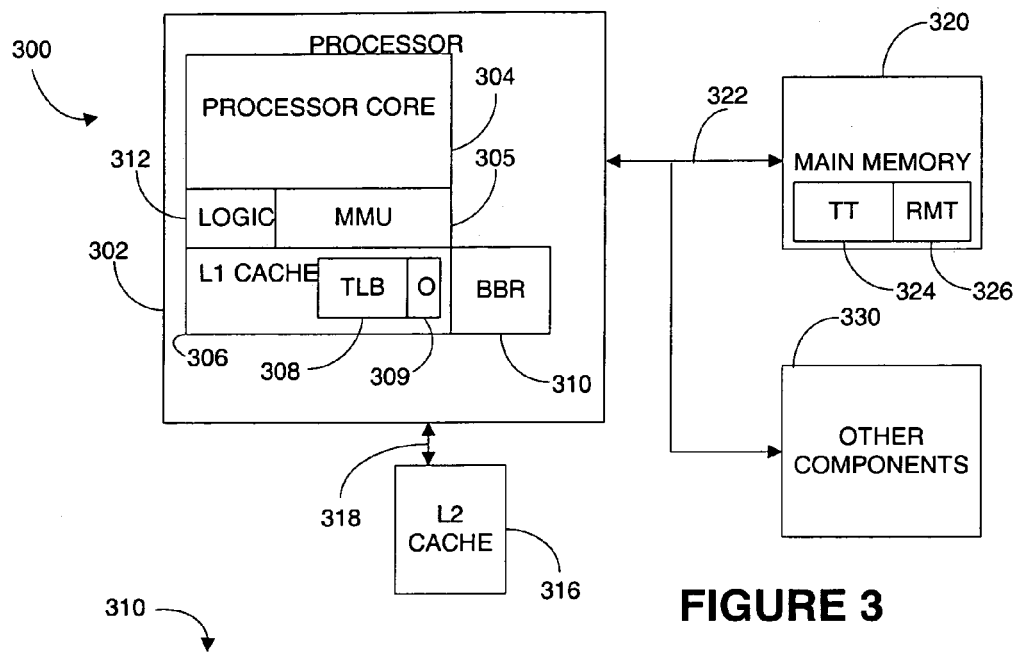
FIG. 3 is a block diagram of a computer system, in accordance with an embodiment of the present invention.
FIGS. 4A and 4B are simplified block diagrams of the base and bounds registers (BBRs), in accordance with embodiments of the present invention.

FIG. 3 is a block diagram of a computer system 300, in accordance with an embodiment of the present invention. The computer system 300 includes a processor die 302, a main memory 320 and a bus system 322 coupling the main memory to the processor. The main memory 320 can include various types of random access memory (RAM) and various types of read-only memory (ROM). The main memory 320 can also include various types of persistent memory such as flash memory or EEPROM. The main memory 320 can also include bulk storage media (e.g., hard drives, optical or magnetic storage media, or other types of data storage). The main memory 320 can also include the translation tables 324 stored therein.

The processor die 302 can include a processor core 304, a memory management unit 305, a L1 cache memory 306, a logic circuit 312 and one or more BBRs 310. The logic circuit 312 can be part of or separate from the MMU 305. A TLB entry is contained within the L1 cache memory 306. An L2 cache 316 can also be coupled to the processor die 302 by a cache bus 318.

The computer system 300 can also include other components 330. While the other components 330 are not shown in detail, one skilled in the art would realize that the other components can include various types of input and output devices (e.g., keyboards, displays, projectors, mouse, printers, scanners, cameras, biometric sensors, and other types of I/O devices). The other components 330 can also include various communication devices (e.g., network interfaces, both wired and wireless, modems, etc.) that enable the computer system 300 to communicate with other computer systems. The other components 330 can also include additional data storage systems (e.g., magnetic or optical or other types of media drives and other storage devices), and one or more additional data buses and controllers to interconnect the various components of the computer system as are well known in the art.

FIGS. 4A and 4B are simplified block diagrams of the base and bounds registers (BBRs) 310, in accordance with embodiments of the present invention. Referring first to FIG. 4A, the BBRs 310 can include multiple registers R1-Rn. Each of the registers R1-Rn in the BBRs 310 describes the span of a corresponding range of main memory 320. Each of the registers R1-Rn in the BBRs 310 can describe a corresponding range of physical addresses in the main memory 320 having the same or varying sizes. By way of example, a first BBR could describe a 1 Gb range of main memory while a second BBR can describe a 16 Gb range of main memory.

Each of the registers R1-Rn in the BBR 310 includes a Base Virtual Address (BVA) field, a Ending Virtual Address (EVA) field, a Physical Address (PA) field and a flags (FLAGS) field that define and the capabilities and attributes of the corresponding pages of the main memory 320.

The value in the BVA field of the first register R1 may be any value representing the starting point of the BVA for the BBR 310. For ease of explanation, an exemplary "0" value is shown in the BVA field of the first register R1.

The EVA field of the first register R1 can include either an ending virtual address or a number of bytes indicating a size of the corresponding page of the main memory 320. By way of example, the EVA field can include a value of "Z" indicating that the corresponding page of the main memory 320 has a size of "Z" bytes. Alternatively, the EVA field can be an ending address equal to BVA+z. The BPA field of register R1 defines the beginning physical address in the main memory 320 that correlates to the EVA field of register R1.

The FLAGS field of register R1 can be used for many purposes including but not limited to a record of a status of the corresponding page in the main memory 320. By way of example, a FLAGS field value of "R" for a read-only page, a "W" for a write-only page, "RW" for read-write page, a E for execute, a M for modified, or a T for tracking R and M. As described in more detail below, the FLAGS field of register R1 can include other values to indicate one or more other status of the corresponding page of the main memory 320.

Similar to register R1 above, register R2 describes a second corresponding page of main memory other than the page corresponding to R1. The BVA field of register R2 defines the beginning point of the second range of virtual memory (e.g., typically the next virtual address following the EVA of the preceding register (e.g., Z+1)). The second range of virtual memory corresponds to a continuous page of main memory having the same size as the range of the register R2. The corresponding page of main memory can follow the ending address of the first page of the main memory or can be located anywhere else in the main memory. The base physical address for each of the registers R1-Rn can be anywhere in the main memory. By way of example, the R1 has a base physical address of Y, R2 has a base physical address of Q and R3 has a base physical address of U, and Rn has a base physical address of G. Referring now to FIG. 4B, each of the registers R'1-R'n can address a different range of virtual addresses. By way of example, the range of R'1 includes Z bytes, R'2 ranges W bytes, R'3 ranges S bytes and R'n ranges P bytes.

Interrogating the BBR 310 can identify the page of main memory 320 that includes the correct physical address and the corresponding TLB entry can be calculated and then be loaded into the TLB 308. In this manner the stall in processing an instruction caused by a TLB miss should be minimized.

Improved Copy-on-Write Faults and Change-Protection

Another embodiment provides a system and a method for improved performance of copy-on-write (COW) faults and change-protection operations using the BBRs 310 and the TLB 308. Unix and Unix-like operating systems create new "child" processes by "forking" copies of a parent process. When a fork occurs, the parent's virtual-to-physical address translations are assigned a read-only status, and a copy of these read-only translations are made for the child process. This allows the parent and child processes to share the same pages of physical addresses in the main memory.

Figure 5:
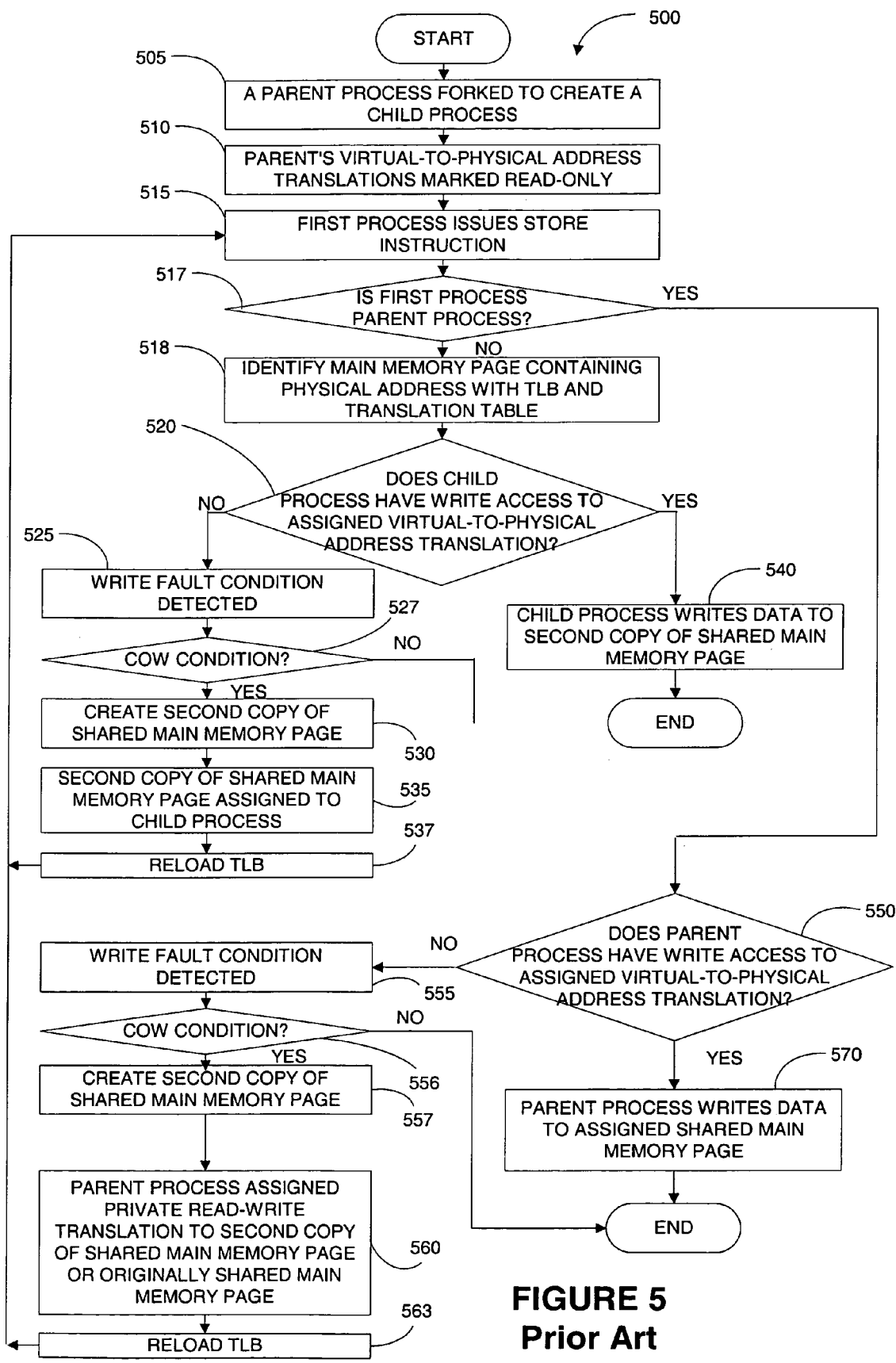
FIG. 5 is a flowchart diagram that illustrates the method operations performed in a typical copy-on-write (COW) fault process.

FIG. 5 is a flowchart diagram that illustrates the method operations performed in a typical copy-on-write (COW) fault process 500. In an operation 505, a parent process is forked to create a child process. In an operation 510, the parent's virtual-to-physical address translations in the TLB 308 and in the translation tables 324 are assigned a read-only status. The read-only status allows both the child and the parent to share access to the same page of main memory (e.g., the shared main memory page).

In an operation 515, a first one of the parent process and child process attempts to issue a write or store instruction to a shared main memory page using the read-only virtual-to-physical address translations. For purposes of example the child process issues the write instruction in operation 515 but it should be understood that either the parent or the child process could be the first process to issue the write instruction. In an operation 517, identifies whether the process issuing the write or store process is the child process or parent process. If the parent process is issuing the write or store instruction then the method operations continue in operation 550 described below. If the child process is issuing the write or store instruction then the method operations continue in operation 518 as described below.

In an operation 518, the virtual-to-physical address translations assigned to the issuing process are examined to identify a TLB entry containing the virtual address that the write instruction is directed to write data to. Performing the virtual-to-physical address translations includes interrogating the TLB and, if required, a TLB walk as described in FIG. 1 above.

In an operation 520, the virtual-to-physical address translations assigned to the issuing process are examined to determine if the child process has write access to the main memory page described by the virtual-to-physical address translations. Furthering the above example, the child process will attempt to write the required value to a physical memory address in the assigned main memory page. If the child process does not have write access to the main memory page, then a write fault condition is detected in an operation 525. However, the child process is assigned to the shared main memory page and since the shared main memory page is assigned a "read-only" status then the data write instruction will fail and the write fault condition occurs. In an operation 527, if a copy on write (COW) condition exists, then the method operations continue in operation 530 as described below. In the alternative, if a copy on, write (COW) condition does not exist, then the method operations can end.

Upon the occurrence of the write fault condition and in an operation 530, a second copy of the shared main memory page is created. In this example the originally shared main memory page will remain assigned to the parent process as read-only. The second copy of the shared main memory page is assigned to the child process in an operation 535 and is assigned a private read-write status so that only the child process can read and write to the second copy of the main memory page. Creating the second copy of the shared main memory page also includes reloading the TLB 308 and the translation tables 324 accordingly in an operation 537.

The method operations continue in operation 515 as described above and the write instruction in the child process that failed in operation 520 is reissued. In the second iteration through operations 515-520, the virtual address is translated to the second copy of the page of main memory and the second copy of the page of main memory is assigned a write status for the child process.

Referring again to operation 520, if the child process does have write access to the assigned main memory page, then the method operations continue in an operation 540. In an operation 540, the child process writes data to the second copy of the shared main memory page. Additional operations not described herein can continue.

Even after one of the processes (e.g., the child process in the above example) performs a COW on the shared main memory page, the other process (e.g., the parent process) will also incur a fault when next attempting to write data to the shared main memory page as described in the following operations.

In an operation 550, the virtual-to-physical address translations in the TLB 308 and the translation table 324 assigned to the parent process are examined to determine if the parent process has write access to the shared main memory page described by the virtual-to-physical address translations. If the parent process does not have write access to the shared main memory page, then a write fault condition is detected in an operation 555. The parent process' write instruction is stalled or faulted by the write fault condition because the originally shared main memory page remains set to read-only access. In an operation 556, if a copy on write (COW) condition exists, then the method operations continue in operation 557 as described below. In the alternative, if a copy on write (COW) condition does not exist, then the method operations can end.

In an operation 557, if a second copy of the shared main memory page was not previously created, then a second copy of the shared main memory page is created and in operation 560, the second copy of the shared main memory page is assigned to the parent process. If in the alternative, the second copy of the shared main memory page was previously created (e.g., in operation 530 above), then operation 557 is not required and in operation 560, the originally shared main memory page is assigned to the parent process and is assigned a private read-write status so that only the parent process can read and write to the originally shared main memory page. In an operation 563, the status of the originally shared main memory page is updated in the TLB and the translation table.

The method operations can continue in operation 515 as described above and the write instruction in the parent process that failed in operation 550 is reissued. Returning again to operation 550, if the parent process has write access to the assigned virtual-to-physical address translation then the method operations continue in operation 570. In operation 570, the parent process writes data to the assigned main memory page (e.g., the originally shared main memory page that is now privately assigned to the parent process or the second copy of the main memory page that is assigned to the parent process).

Continuing the above example, where the child process initiated the COW, when the parent process next executes a write instruction, the write instruction is stalled until the originally shared memory page is reassigned read write (RW) private status. Changing from RW private status, to RO shared status, and back to RW private status is complex, expensive and slow.

Figure 6:
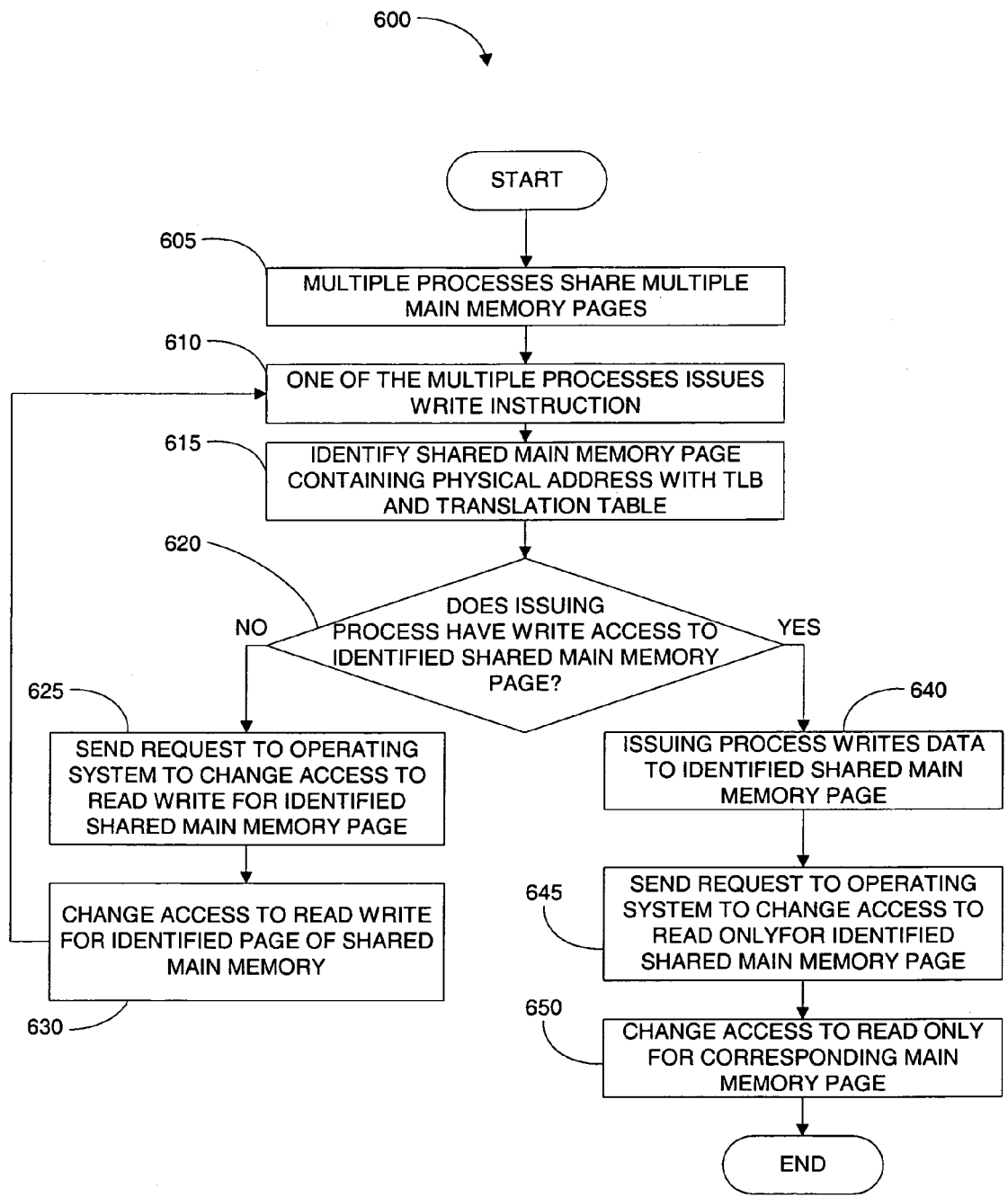
FIG. 6 is a flowchart diagram that illustrates the method operations performed in a typical change-protection process.

FIG. 6 is a flowchart diagram that illustrates the method operations performed in a typical change-protection process 600. The typical change-protection process involves a relatively large portion of the main memory (e.g., multiple pages of main memory) that is being shared by multiple processes and assigned RO access. In an operation 605, multiple processes are sharing multiple main memory pages.

In an operation 610, one of the multiple process (i.e., an issuing process) issues a write instruction to attempt to write to one of the shared pages of the main memory. In an operation 615, the virtual-to-physical address translations assigned to the issuing process are examined to identify a shared main memory page containing the physical address that the write instruction is to write data to. Performing the virtual-to-physical address translations includes interrogating the TLB and if required a TLB Walk as described above.

In an operation 620, the virtual-to-physical address translations assigned to the issuing process are examined to determine if the issuing process has write access to the identified shared main memory page containing the physical address identified by the virtual-to-physical address translation. If the issuing process does not have write access to the identified shared main memory page, then a request is sent to the operating system to change the access to read write for the identified shared main memory page in an operation 625.

In an operation 630, the operating system changes the identified shared main memory page to read-write status. The remaining shared main memory pages remain read-only. The method operations continue in operation 610 as described above, where the issuing process reissues the write instruction.

Referring again to operation 620, if the issuing process has write access to the identified shared main memory page, then the method operations continue in operation 640. In operation 640, the issuing process writes data to the corresponding page of shared main memory.

In an operation 645, the issuing process requests the operating system change the access to read-only status for the identified shared main memory page. In an operation 650, the operating system changes the corresponding identified shared main memory page to read-only status and the method operations can end.

One approach to reducing the cost of the change-protection operation includes using smaller range TLB entries and translation table pages to map the shared main memory pages, as only one relatively small shared main memory page would need to be modified. However, using smaller translation mappings would significantly slow down the more common read-only accesses by all of the processes because the smaller translation page mapping increases the TLB miss rate.

Alternatively, if the shared main memory pages are mapped with large-page translations, a large quantity of work is needed to create the temporary RW mapping as follows: The large TLB page containing the target value is replaced by multiple smaller translation pages (all but one being assigned read-only access). The update operation can then be applied to the smaller translation page that has RW access assigned. The small translation pages can then be disassembled and replaced by a single, large read-only translation page.

One embodiment of the present invention substantially increases the speed of both the COW and the typical change-protection processes. As described above, BBRs 310 can generate TLB entries more efficiently to minimize delays caused by TLB misses. Similarly, the translation tables 324 can also be used to produce entries for the TLB 308. The MMU 305 can initially review the TLB 308 for a hit. In the event of the TLB miss, the MMU 305 can attempt to use the BBRs 310 to generate a TLB entry. If the BBRs 310 do not have a valid entry for this translation (i.e., a "BBR miss"), the MMU 305 (or the operating system on computer systems where the software performs the translation table walk) can search the translation tables 324 for a valid entry for the TLB. If the translation tables 324 don't have a valid entry (i.e., a "TT miss"), the operating system is signaled to handle the issue. Searching the BBRs 310 for a valid entry reduces the delays caused by TLB misses in the COW and the change-protection processes.

To further accelerate the typical COW (as described in FIG. 5 above) and the typical change-protection processes (as described in FIG. 6 above), another bit, or bit value (i.e., the TT.FLAG), can be added to BBR.FLAGS field. The TT.FLAG can indicate that no overriding translation table entries exist for the given range of virtual addresses. The TT.FLAGs can be used to avoid further memory references in the case where the TT.FLAGs indicate to the operating system knows that such memory references would not be useful and are therefore unnecessary. Following the BBR search with a traditional table walk allows both the copy on write (COW) and change-protection processes can be improved dramatically.

Figure 7:
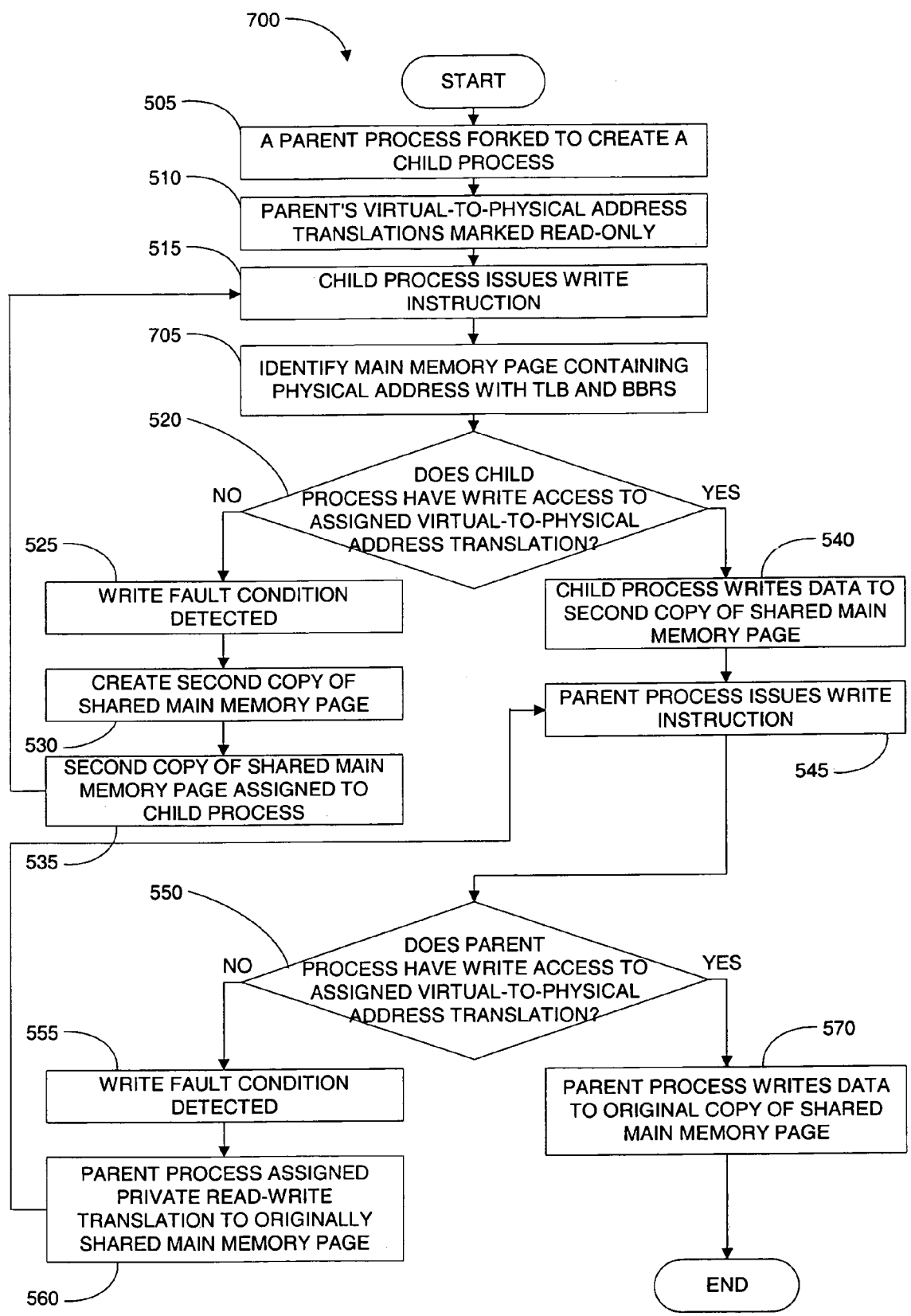
FIG. 7 is a flowchart of the method operations for an improved copy on write (improved COW) process, in accordance with an embodiment of the present invention.

FIG. 7 is a flowchart of the method operations for an improved copy on write (improved COW) process 700, in accordance with an embodiment of the present invention. The improved COW process 700 is substantially similar to the typical COW process 500 described in FIG. 5 above except that in an operation 705 the BBRs and the translation tables are used with the TLBs as described in more detail in FIG. 2 above. In this manner the TLBs and BBRs can be used to minimize the delay if a TLB miss occurs. By way of example, when a process forks, the operating system can change the access status of any BBRs assigned to the forking process from read-write to read-only, and the TLB can be flushed of any residual read-write translations. This would substantially minimize and even eliminate the need to walk through the translation table for the bulk of the process' address space.

Both the parent and child process could run as before. When either process attempted to write to a page that was mapped by an entry in the BBR, the TLB would fault because any translations for that page would be read-only status in the TLB. The BBRs would also fault because any translations for that page would be read-only status in the BBRs. A search of the translation tables would also fail at this point, since the only translation comes from the BBR. As a result a request is sent to the operating system to resolve the issue. The operating system would create a copy of the shared main memory page, create an entry in the translation table for the new copy of the shared main memory page, and request the faulting instruction be reissued. After searching the TLB and the BBRs, the hardware would find a matching entry in the translation table and use that entry in the TLB, allowing the instruction to complete.

If either the child or parent process stop sharing a shared main memory page, the BBR corresponding to the now previously shared main memory page could be replaced with a Read-write entry. Adjusting the BBR for a shared main memory page from read-only to read-write would not even require a TLB flush, since any write attempt that faulted on a read-only TLB entry would get a read-write entry automatically generated from the new BBR entry without causing a fault to be sent to the operating system.

Figure 8:
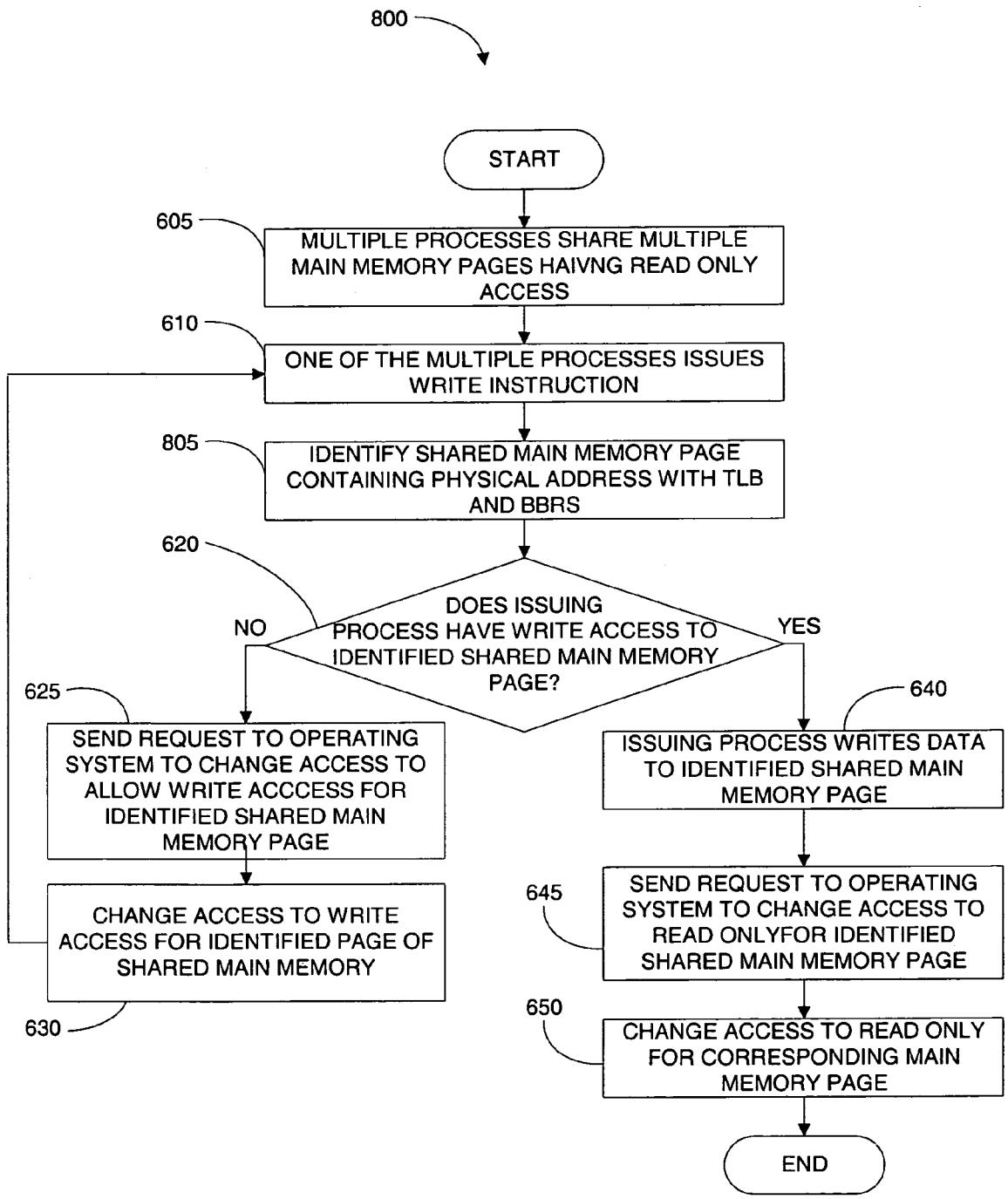
FIG. 8 is a flowchart for the method operations for an improved change-protection process, in accordance with an embodiment of the present invention.

FIG. 8 is a flowchart for the method operations for an improved change-protection process 800, in accordance with an embodiment of the present invention. The improved change-protection process 800 is substantially similar to the typical change-protection process 600 described in FIG. 6 above except that in an operation 805 the BBRs are used with the TLBs as described in FIG. 2 above. In this manner the change-protection operation is improved by starting with a single read-only BBR entry for the shared main memory page. By way of example, when the read-write status change request arrives, the operating system adds a read-write entry to the translation table. When the offending (i.e., writing) instruction is issued, the hardware will look in the TLB for an entry, find a read-only status entry, look in the BBRs and find an read-only status entry, and finally, search the translation table for an entry. In the translation table, the hardware will find the read-write entry that the operating system added. That entry is loaded into the TLB and the write instruction is reissued. The translation table flags may specify read-write status but the corresponding physical address must be the same as the BBR physical address.

When the read-only status change request occurs, the operating system removes the single entry from the translation table, flush that entry from the TLB using the existing flush mechanism, and continue processing. All of these operations are constant-time and constant-space because only one translation table entry is being modified.

Improved Reference an Modification Tracking

Another embodiment of the present invention provides a system and method to improve reference and modification tracking. Typically, TLBs track references to and modifications of physical memory addresses by setting a respective reference bit value and a respective modification bit value in a respective reference and modification field in each of the TLB entries.

Figure 9:
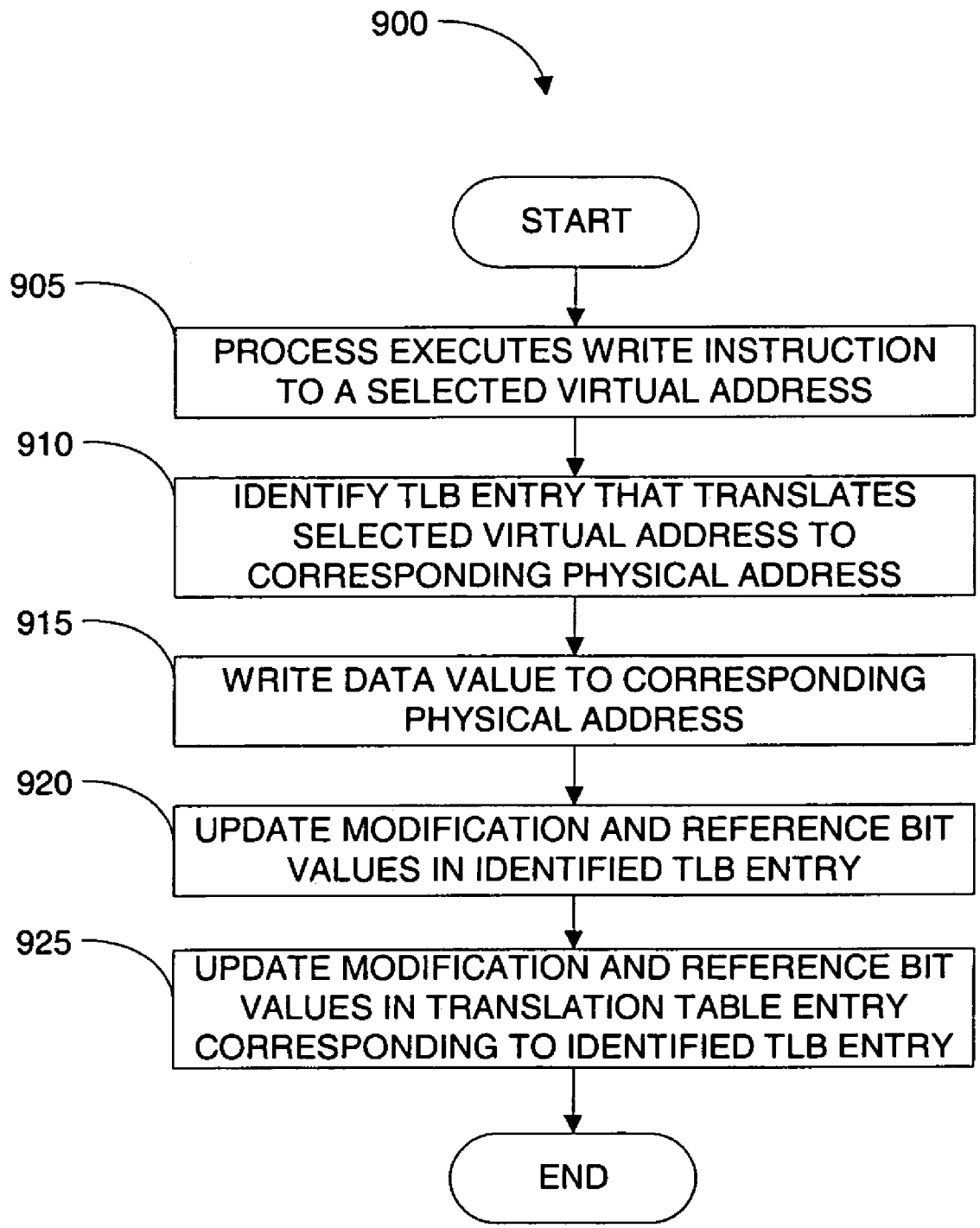
FIG. 9 is a flowchart diagram of typical process propagating the reference and modification bit values into the translation table.

FIG. 9 is a flowchart diagram of typical process propagating the reference and modification bit values into the translation table 900. In an operation 905, a process issues a write instruction to write a data value to a selected virtual address. In an operation 910, the TLB is interrogated to identify a TLB entry that translates selected virtual address to corresponding physical address.

In an operation 915, data value is written to the corresponding physical address and the modification and reference bit values are updated in the identified TLB entry in an operation 920. The process that issued the write instruction can continue processing. The modification and reference bit values are updated in the identified TLB entry to indicate that the corresponding physical memory location and been accessed (e.g., referenced) or modified (e.g., written to). Setting the modification and reference bit values indicates that the translation tables in the main memory need to be updated.

As the process that issued the write instruction continues processing and in a operation 925, the updated reference bit value and the updated modification bit value in the identified TLB entry are propagated to a corresponding entry in the translation tables 324 stored in the main memory 320. The translation tables 324 can therefore provide a back-up for the TLB entries. Propagating the reference bit value and the modification bit value into the translation tables is expensive, as it requires memory accesses.

One approach to improve how TLBs track references to and modifications of physical memory is to use the BBRs 310 similar to that described in FIG. 2 above. Additional bit values (hereafter referred to as FLAGS.TR for track reference and FLAGS.TM, for track modification) can be added to the FLAGS field of each BBR. The FLAGS.TR and FLAGS.TM may require additional bit space allocated to the FLAGS field to accommodate the FLAGS.TR and FLAGS.TM. The FLAGS.TR and FLAGS.TM can be used to indicate whether the hardware should track the reference and modification flags at all. The operating system can also use the FLAGS.TR and FLAGS.TM to determine that a page in main memory does or does not require updated reference or modification information. By way of example, flushing to stable storage can be managed entirely by software and could clear the relevant FLAGS.TR and FLAGS.TM flags.

A Referenced/Modified Table field (RMT field) can also be added to the BBRs for tracking reference and/or modification in the cases where FLAGS.TR or FLAGS.TM are set. The RMT field for each entry in the BBRs includes a physical address for the corresponding Referenced/Modified Table 326 in the main memory. A BBR entry that has FLAGS.TR and/or FLAGS.TM set to indicate the BBR entry has been referenced or modified would also have a valid RMT address. The RMT would include an entry for each page translated by the BBR entry. The RMT field could be as dense as 2 bits per physical memory page.

An additional field or flag (ORIGIN flag 309) could also be added to each TLB entry that indicates the origin of each TLB entry. The origin of each TLB entry can be loaded from the translation table 324 or generated from the BBR 310 as described in FIG. 2 above. The ORIGIN flag 309 can be used to indicate where the FLAGS.TR and FLAGS.TM bit values need to be propagated. By way of example, if an ORIGIN flag 309 for a TLB entry indicates that the origin for the TLB entry is the BBR 310, then the ORIGIN flag 309 and the FLAGS.TR and FLAGS.TM can be used in combination to update only those memory locations specifically required.

Figure 10:
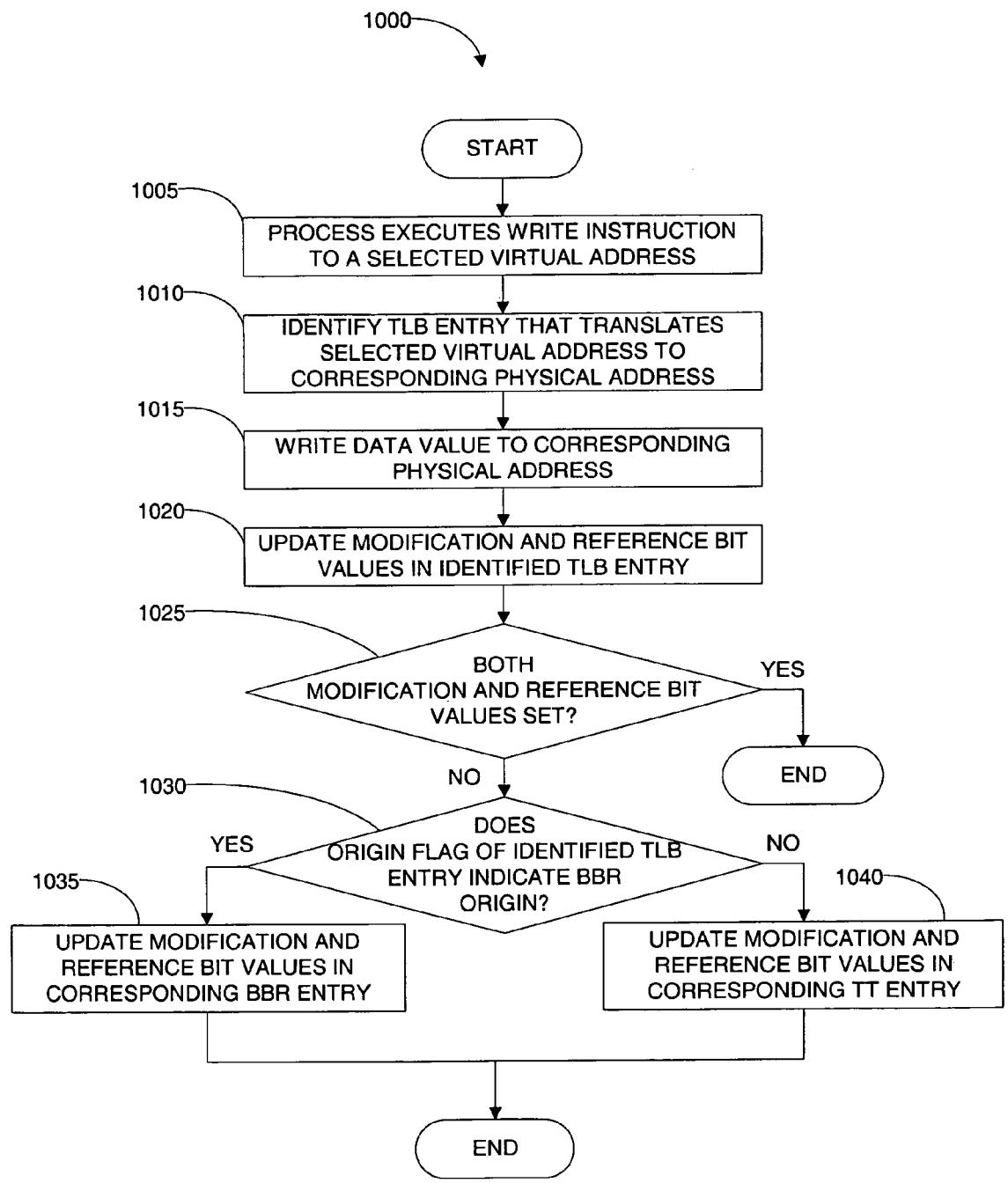
FIG. 10 is a flowchart diagram of an improved process for propagating the reference and modification bit values into the translation table.

FIG. 10 is a flowchart diagram of an improved process for propagating the reference and modification bit values into the translation table 1000. In an operation 1005, a process issues a write instruction to write a data value to a selected virtual address. In an operation 1010, the TLB is interrogated to identify a TLB entry that translates selected virtual address to corresponding physical address.

In an operation 1015, data value is written to the corresponding physical address. In an operation 1020, the modification and reference bit values are updated in the identified TLB entry.

As the process that issued the write instruction continues processing and in an operation 1025, the TLB is analyzed to determine if both the modification and the reference bit values are set to indicate the corresponding TLB entries have been referenced or modified. If both of the modification and the reference bit values are set to indicate the corresponding TLB entries have been referenced or modified, then the method operations can end.

If in operation 1025, one or none of the modification and/or reference bit values are set to indicate the corresponding TLB entries have been referenced or modified, then each of the corresponding entries in the BBR and/or translation table are updated. The origin flag can be used to determine which of the BBR or the translation table should be updated. By way of example in an operation 1030, the origin flag of each of the identified TLB entries can be examined. If the origin flag of the identified TLB entry indicates a BBR origin, then the method operations continue in operation 1035.

In operation 1035, the modification and reference bit values are updated in the corresponding entry in the BBR and the method operations continue can end. If in operation 1030, the origin flag of the identified TLB entry indicates a translation table origin, then the method operations continue in operation 1040. In operation 1040, the modification and reference bit values are updated in the corresponding entry in the translation table and the method operations can end.

The BBRs could also be modified to support TLB entries having multiple sized ranges. The range of the generated TLB entry is independent of the BBRs. Having an RMT creates an implicit dependency on the size of the generated TLB entries, as the page size is needed to size the RMT appropriately. To make this dependency more explicit, the BBR could add another field (e.g., one or more of the bits or bit values in the BBR.FLAGS field) indicating the size of the generated TLB entries corresponding to each BBR entry. The RMT could then be sized appropriately based on the explicitly stated page size. The FLAGS.TR and FLAGS.TM bit values thereby avoid unnecessary memory references for situations where software doesn't require a memory reference and modification to be tracked. The RMT would provide better cache performance than a table walk, both because the RMT is dense and because the RMT is a single-level table. Both aspects improve system performance by reducing the number of memory references.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system comprising:
   a main memory; and
   a processor die coupled to the main memory by a first bus, the processor die including a processor core coupled to a first cache memory and a plurality of base and bounds registers, each one of the plurality of base and bounds registers having a base virtual address field, an ending virtual address field and a base physical address field, the first cache memory having a table lookaside buffer entry stored therein.

2. The computer system of claim 1, wherein the base virtual address field for each one of the plurality of base and bounds registers includes a first virtual address for a corresponding page of main memory, wherein the ending virtual address field for each one of the plurality of base and bounds registers includes a size of the corresponding page of main memory, and wherein the base physical address field for each one of the plurality of base and bounds registers includes a first physical address of the corresponding page of main memory.

3. The computer system of claim 1, wherein each one of the plurality of base and bounds registers includes a flags field.

4. The computer system of claim 3, wherein the flags field includes a status of the corresponding page of main memory.

5. The computer system of claim 1, further comprising:
   logic for determining the selected virtual address is not within a reach of a table lookaside buffer entry that is currently loaded in the table lookaside buffer;
   logic for identifying one of the plurality of the base and bounds register entries that includes the selected virtual address if one of a plurality of base and bounds register entries includes the selected virtual address;
   logic for calculating a new table lookaside buffer entry that includes the selected virtual address; and
   logic for loading the new table lookaside buffer entry in the table lookaside buffer.

6. The computer system of claim 1, wherein the processor die includes:
   logic for determining the selected virtual address is not within a reach of a table lookaside buffer entry that is currently loaded in the table lookaside buffer;
   logic for identifying one of the plurality of the base and bounds register entries that includes the selected virtual address if one of a plurality of base and bounds register entries includes the selected virtual address;
   logic for calculating a new table lookaside buffer entry that includes the selected virtual address; and
   logic for loading the new table lookaside buffer entry in the table lookaside buffer.

7. The computer system of claim 1, further comprising a second cache memory.

8. The computer system of claim 7, wherein the second cache memory includes at least one additional entry of the table lookaside buffer.

9. The computer system of claim 1, wherein the main memory includes at least one additional entry of the table lookaside buffer.

10. A method of translating a selected virtual address in a memory reference comprising:
    determining the selected virtual address is not within a reach of a table lookaside buffer entry that is currently loaded in the table lookaside buffer;
    if one of a plurality of base and bounds register entries includes the selected virtual address, then identifying one of the plurality of the base and bounds register entries that includes the selected virtual address;
    calculating a new table lookaside buffer entry that includes the selected virtual address; and
    loading the new table lookaside buffer entry in the table lookaside buffer.

11. The method of claim 10, wherein if the selected virtual address is within a reach of a table lookaside buffer entry that is currently loaded in the table lookaside buffer, then:
    translating the selected virtual address to a corresponding physical address; and
    accessing the memory location at the corresponding physical address.

12. The method of claim 10, wherein if none of the plurality of base and bounds register entries includes the selected virtual address, then:
    loading a next table look aside buffer entry in the table lookaside buffer; and
    examining the table lookaside buffer to determine if the selected virtual address is within a reach of the table lookaside buffer entry that is currently loaded in the table lookaside buffer.

13. The method of claim 10, wherein each one of the plurality of base and bounds registers includes a base virtual address field, an ending virtual address field and a base physical address field.

14. The method of claim 13, wherein the base virtual address field for each one of the plurality of base and bounds registers includes a first virtual address for a corresponding page of main memory, wherein the ending virtual address field, for each one of the plurality of base and bounds registers includes a size of the corresponding page of main memory, and wherein the base physical address field for each one of the plurality of base and bounds registers includes a first physical address of the corresponding page of main memory.

15. The method of claim 10, wherein each one of the plurality of base and bounds register entries includes a flags field.

16. The method of claim 15, wherein the flags field includes at least one status of the corresponding base and bounds entry.

17. The method of claim 16, wherein the at least one status of the corresponding base and bounds entry includes at least one of a read status, and write status, and read-only status, a read-write status, a referenced status or a modified status.

18. A method for processing an instruction comprising:
    determining the selected virtual address is not within a reach of a table lookaside buffer entry that is currently loaded in the table lookaside buffer;

if one of a plurality of base and bounds register entries includes the selected virtual address, then:
  identifying one of the plurality of the base and bounds register entries that includes the selected virtual address;
  calculating a new table lookaside buffer entry that includes the selected virtual address; and
  loading the new table lookaside buffer entry in the table lookaside buffer;
if the selected virtual address is within a reach of a table lookaside buffer entry that is currently loaded in the table lookaside buffer, then:
  translating the selected virtual address to a corresponding physical address; and
  accessing the memory location at the corresponding physical address;
if none of the plurality of base and bounds register entries includes the selected virtual address, then:
  loading a next table look aside buffer entry in the table lookaside buffer; and
  examining the table lookaside buffer to determine if the selected virtual address is within a reach of the table lookaside buffer entry that is currently loaded in the table lookaside buffer.

* * * * *